(12) United States Patent
Su et al.

(10) Patent No.: US 11,315,421 B2
(45) Date of Patent: Apr. 26, 2022

(54) SYSTEMS AND METHODS FOR PROVIDING DRIVING RECOMMENDATIONS

(71) Applicant: Toyota Motor Engineering & Manufacturing North America, Inc., Plano, TX (US)

(72) Inventors: Jianyu Su, Charlottesville, VA (US); Kyungtae Han, Palo Alto, CA (US); Rui Guo, San Jose, CA (US); Roger D. Melen, Los Altos Hills, CA (US)

(73) Assignee: Toyota Motor engineering & Manufacturing North America, Inc., Plano, TX (US)

( * ) Notice: Subject to any disclaimer, the term of this patent is extended or adjusted under 35 U.S.C. 154(b) by 154 days.

(21) Appl. No.: 16/689,255

(22) Filed: Nov. 20, 2019

(65) Prior Publication Data

US 2021/0150899 A1 May 20, 2021

(51) Int. Cl.
*G08G 1/0967* (2006.01)
*B60W 30/16* (2020.01)
(Continued)

(52) U.S. Cl.
CPC ....... *G08G 1/096708* (2013.01); *B60W 30/12* (2013.01); *B60W 30/162* (2013.01); *G06N 3/049* (2013.01)

(58) Field of Classification Search
CPC .. G08G 1/096708; G08G 1/163; G08G 1/164; B60W 30/12; B60W 50/0097;
(Continued)

(56) References Cited

U.S. PATENT DOCUMENTS

| 10,243,604 B2 | 3/2019 | Ross et al. |
| 2013/0099941 A1 | 4/2013 | Jana et al. |

(Continued)

FOREIGN PATENT DOCUMENTS

WO 2019081781 A1 5/2019

OTHER PUBLICATIONS

James Jian Qiao Yu, Member, IEEE, and Jiatao Gu, "Real-Time Traffic Speed Estimation With Graph Convolutional Generative Autoencoder", Oct. 2019, IEEE Transactions on Intelligent Transportation Systems, vol. 20, No. 10, (Year: 2019).*

(Continued)

*Primary Examiner* — Abby Y Lin
*Assistant Examiner* — Esvinder Singh
(74) *Attorney, Agent, or Firm* — Christopher G. Darrow; Darrow Mustafa PC

(57) ABSTRACT

Systems and methods for providing driving recommendations are disclosed herein. One embodiment receives, at an ego vehicle, first vehicle data and first encoded information from one or more other vehicles; constructs, from the first vehicle data, graph data representing how the ego vehicle and the one or more other vehicles are spatially related; inputs the graph data, the first vehicle data, second vehicle data pertaining to the ego vehicle, and the first encoded information to a graph convolutional network that outputs second encoded information; inputs the second encoded information and previously stored encoded information to a recurrent neural network that outputs a set of parameters to a mixture model; predicts acceleration of the one or more other vehicles using the mixture model; and generates a driving recommendation for the ego vehicle based, at least in part, on the predicted acceleration of the one or more other vehicles.

15 Claims, 7 Drawing Sheets

(51) Int. Cl.
  *B60W 30/12* (2020.01)
  *G06N 3/04* (2006.01)
(58) Field of Classification Search
  CPC .. B60W 60/0027; B60W 30/14; G06N 3/049;
       H04L 1/065; H04L 1/1816; H04W 4/46;
       G06B 2219/33025; G06B 2219/43049
  See application file for complete search history.

(56) References Cited

U.S. PATENT DOCUMENTS

| | | | | |
|---|---|---|---|---|
| 2020/0276972 | A1* | 9/2020 | Ito | B60W 30/18072 |
| 2020/0319330 | A1* | 10/2020 | Bliss | G01S 13/876 |
| 2021/0046954 | A1* | 2/2021 | Haynes | G06N 20/00 |
| 2021/0049452 | A1* | 2/2021 | Fan | G06F 11/079 |
| 2021/0109545 | A1* | 4/2021 | Lopez | G05D 1/0291 |
| 2021/0133990 | A1* | 5/2021 | Eckart | G06T 7/60 |

OTHER PUBLICATIONS

Sebastian et al., "A Multicast Routing Scheme for Efficient Safety Message Dissemination in VANET," IEEE Wireless Communications and Networking Conference, Apr. 18-21, 2010, Sydney, Australia, found at http://eprints.qut.edu.au/32242/1/c32242.pdf, in 7 pages.
Diehl, et al., "Graph Neural Networks for Modelling Traffic Participant Interaction," 2019 IEEE Intelligent Vehicles Symposium (IV), Paris France, Jun. 9-12, 2019, in 7 pages.
Ma et al., "TrafficPredict: Trajectory Prediction for Heterogeneous Traffic-Agents," The Thirty-Third AAAI Conference on Artificial Intelligence (AAAI-19), 2019, found at https://aaai.org/ojs/index.php/AAAI/article/view/4569/4447, in 8 pages.
Mohanty et al., "Graph CNN + LSTM Framework for Dynamic Macroscopic Traffic Congestion Prediction," found at https://www.mlgworkshop.org/2018/papers/MLG2018_paper_41.pdf, in 11 pages.
Huang et al., "V2V Data Offloading for Cellular Network Based on the Software Defined Network (SDN) Inside Mobile Edge Computing (MEC) Architecture," IEEE, Mar. 29, 2018, found at https://ieeexplore.IEEE.org/stamp/stamp.jsp?arnumber=8328023, in 15 pages.
Khan et al., "Edge Computing: A Survey," Elsevier, Apr. 2, 2019, found at https://www.researchgate.net/profile/Ibrar_Yaqoob/publication/331362529_Edge_computing_A_survey/links/5ca33dcca6fdcc12ee8c3a2a/Edge-computing-A-survey.pdf, in 39 pages.
Sebastian et al., "Multi-vehicles interaction graph model for cooperative collision warning system," Intelligent Vehicles Symposium, 2009 IEEE, Jun. 3-5, 2009, found at http://eprints.qut.edu.au/28622/1/c28622 pdf, in 6 pages.
Cui et al., "Deep Kinematic Models for Physically Realistic Prediction of Vehicle Trajectories," found at https://arxiv.org/pdf/1908.00219.pdf, in 10 pages.
Wu et al., "A Comprehensive Survey on Graph Neural Networks," Journal of Latex Class Files, vol. XX, No. XX, Aug. 2019, found at https://arxiv.org/pdf/1901.00596.pdf, in 22 pages.
Xie, "Sequential Graph Neural Network for Urban Road Traffic Speed Prediction," IEEE, 2016, found at https://ieeexplore.ieee.org/stamp/stamp.jsp?arnumber=8708297, in 11 pages.
Yu, "Real-Time Traffic Speed Estimation with Graph Convolutional Generative Autoencoder," IEEE Transactions on Intelligent Transportation Systems, vol. 20, No. 10, Oct. 2019, bibliographic reference found at https://www.semanticscholar.org/paper/Real-Time-Traffic-Speed-Estimation-With-Graph-Yu-Gu/eedf9c638f64bf9ab12e32bc31c1ae4ef7f5966b, in 12 pages.
Zhang et al., "Deep Learning on Graphs: A Survey," found at https://arxiv.org/pdf/1812.04202.pdf, in 15 pages.
Fout et al., "Protein interface prediction using graph convolutional networks", In Advances in Neural Information Processing Systems, 6530-6539, (2017).
Hamaguchi et al., "Knowledge transfer for out-of-knowledge-base entities: A graph neural network approach", 7 pages, found at: arXiv: 1706.05674v2 [cs.CL] Jun. 20, 2017.
Hamilton et al., "Inductive representation learning on large graphs", 18 pages, found at: arXiv:1706.02216v1 [cs.SI] Jun. 7, 2017.
Hochreiter et al., "Long short-term memory", Neural computation 9(8):1735-1780.
Ioffe et al., "Batch normalization: Accelerating deep network training by reducing internal covariate shift", found at: arXiv:1502.03167v3 [cs.LG] Mar. 2, 2015.
Kikuchi et al., "Car-following model based on fuzzy inference system", Transportation Research Record 82-91 (1992).
Kim et al., "Probabilistic vehicle trajectory prediction over occupancy grid map via recurrent neural network", 6 pages, found at: arXiv:1704.07049v2 [cs.LG] Sep. 1, 2017.
Kingma et al., "Adam: A method for stochastic optimization", 9 pages, found at: arXiv:1412.6980v1 [cs.LG] Dec. 22, 2014.
Kipf et al., "Semi-supervised classification with graph convolutional networks", 13 pages, found at: arXiv:1609.02907v3 [cs.LG] Nov. 3, 2016.
Lefevre et al, "Comparison of parametric and non-parametric approaches for vehicle speed prediction", In 2014 American Control Conference, 3494-3499. IEEE (2014).
Morton et al, "Analysis of recurrent neural networks for probabilistic modeling of driver behavior", IEEE Transactions or Intelligent Transportation Systems 18(5):1289-1298.
Pascanu et al., "On the difficulty of training recurrent neural networks", 12 pages, found at: arXiv:1211.5063v2 [cs.LG] Feb. 16, 2013.
Altche at al., "An LSTM network for highway trajectory prediction", 7 pages, found at: arXiv:1801.07962v1 [cs.RO] Jan. 24, 2018.
Chandler et al., "Traffic dynamics: studies in car following", Operations research6(2):165-184 (1958).
Colyar et al., US highway 80 dataset, federal highway administration (FHWA), vol. Tech, No. Rep. (2006).
Robinson et al., "The use of recurrent neural networks in continuous speech recognition", In Automatic speech and speaker recognition. Springer. 159-184.
Zhou et al., "Graph neural networks: A review of methods and applications" 20 pages, found at: arXiv:1812.08434v1 [cs.LG] Dec. 20, 2018.
Montanino et al., "Making NGSIM data usable for studies on traffic flow theory: Multistep method for vehicle trajectory reconstruction", Transportation Research Record 2390(1):99-111 (2013).
Montanino et al., "Trajectory data reconstruction and simulation-based validation against macroscopic traffic patterns", Transportation Research Part B: Methodological 80, pp. 82-106 (2015).
Christopher M. Bishop, "Mixture Density Networks," Technical Report. Aston University, Birmingham, 26 pages (1994).
Helly, W., "Simulation of bottlenecks in single-lane traffic flow," Theory of Traffic Flow, Proceedings, abstract (1959).
Ranjitkar et al., "Car-Following Models: An Experiment Based Benchmarking," Journal of the Eastern Asia Society for Transportation Studies, vol. 6, pp. 1582-1596 (2005).
Lenz et al., "Deep neural networks for Markovian interactive scene prediction in highway scenarios," 2017 IEEE Intelligent Vehicles Symposium (IV), pp. 685-692 (2017).
Saifuzzaman et al., "Incorporating human-factors in car-following models: A review of recent developments and research needs," Transportation Research Part C Emerging Technologies, 40 pages (2014).

\* cited by examiner

SYSTEMS AND METHODS FOR PROVIDING DRIVING RECOMMENDATIONS

TECHNICAL FIELD

The subject matter described herein generally relates to vehicles and, more particularly, to systems and methods for providing driving recommendations.

BACKGROUND

Connected-vehicle technology—technology that enables vehicles to communicate with one another directly, with the cloud, or with infrastructure via one or more wireless networks—can provide drivers and vehicle systems with a wealth of information about the environment surrounding a vehicle. Such information can be used to assist both manually driven and autonomous vehicles.

SUMMARY

An example of a system for providing driving recommendations is presented herein. The system comprises one or more processors and a memory communicably coupled to the one or more processors. The memory stores a communication module including instructions that when executed by the one or more processors cause the one or more processors to receive, at an ego vehicle, first vehicle data and first encoded information from one or more other vehicles. The memory also stores a graph construction module including instructions that when executed by the one or more processors cause the one or more processors to construct, from the first vehicle data, graph data representing how the ego vehicle and the one or more other vehicles are spatially related. The memory also stores an information encoding module including instructions that when executed by the one or more processors cause the one or more processors to input the graph data, the first vehicle data, second vehicle data pertaining to the ego vehicle, and the first encoded information to a graph convolutional network, the graph convolutional network outputting second encoded information. The memory also stores a temporal processing module including instructions that when executed by the one or more processors cause the one or more processors to input the second encoded information and previously stored encoded information to a recurrent neural network, the recurrent neural network outputting a set of parameters to a mixture model. The memory also stores a prediction module including instructions that when executed by the one or more processors cause the one or more processors to predict acceleration of the one or more other vehicles using the mixture model. The memory also stores a recommendation generation module including instructions that when executed by the one or more processors cause the one or more processors to generate a driving recommendation for the ego vehicle based, at least in part, on the predicted acceleration of the one or more other vehicles.

Another embodiment is a method of providing driving recommendations. The method includes receiving, at an ego vehicle, first vehicle data and first encoded information from one or more other vehicles. The method also includes constructing, from the first vehicle data, graph data representing how the ego vehicle and the one or more other vehicles are spatially related. The method also includes inputting the graph data, the first vehicle data, second vehicle data pertaining to the ego vehicle, and the first encoded information to a graph convolutional network, the graph convolutional network outputting second encoded information. The method also includes inputting the second encoded information and previously stored encoded information to a recurrent neural network, the recurrent neural network outputting a set of parameters to a mixture model. The method also includes predicting acceleration of the one or more other vehicles using the mixture model. The method also includes generating a driving recommendation for the ego vehicle based, at least in part, on the predicted acceleration of the one or more other vehicles.

In another embodiment, a system for providing driving recommendations is disclosed. The system comprises one or more processors and a memory communicably coupled to the one or more processors. The memory stores a communication module including instructions that when executed by the one or more processors cause the one or more processors to receive vehicle data from one or more vehicles. The memory also stores a graph construction module including instructions that when executed by the one or more processors cause the one or more processors to construct, from the vehicle data, graph data representing how the one or more vehicles are spatially related. The memory also stores an information encoding module including instructions that when executed by the one or more processors cause the one or more processors to input the graph data and the vehicle data to a graph convolutional network, the graph convolutional network outputting encoded information. The memory also stores a temporal processing module including instructions that when executed by the one or more processors cause the one or more processors to input the encoded information and previously stored encoded information to a recurrent neural network, the recurrent neural network outputting a set of parameters to a mixture model. The memory also stores a prediction module including instructions that when executed by the one or more processors cause the one or more processors to predict acceleration of the one or more vehicles using the mixture model. The memory also stores a recommendation generation module including instructions that when executed by the one or more processors cause the one or more processors to generate a driving recommendation for at least one of the one or more vehicles based, at least in part, on the predicted acceleration of the one or more vehicles. The communication module includes further instructions that when executed by the one or more processors cause the one or more processors to transmit the driving recommendation to the at least one of the one or more vehicles.

Another embodiment is a method of providing driving recommendations. The method includes receiving vehicle data from one or more vehicles. The method also includes constructing, from the vehicle data, graph data representing how the one or more vehicles are spatially related. The method also includes inputting the graph data and the vehicle data to a graph convolutional network, the graph convolutional network outputting encoded information. The method also includes inputting the encoded information and previously stored encoded information to a recurrent neural network, the recurrent neural network outputting a set of parameters to a mixture model. The method also includes predicting acceleration of the one or more vehicles using the mixture model. The method also includes generating a driving recommendation for at least one of the one or more vehicles based, at least in part, on the predicted acceleration of the one or more vehicles. The method also includes transmitting the driving recommendation to the at least one of the one or more vehicles.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
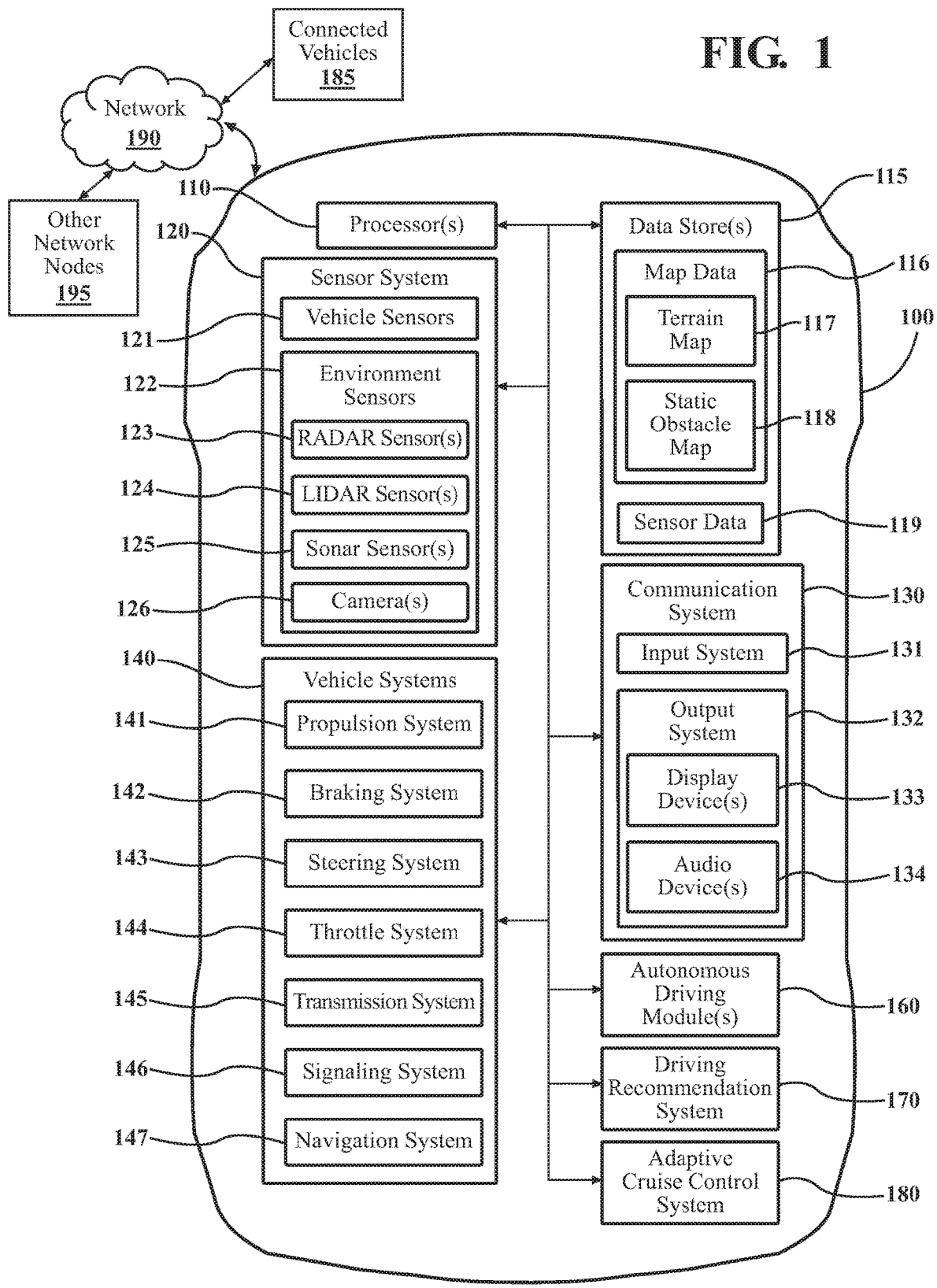
FIG. 1 illustrates one embodiment of a vehicle within which systems and methods disclosed herein may be implemented.

One important aspect of autonomous driving systems and intelligent driver-assistance systems is the ability to model and predict the movement of the traffic surrounding an ego vehicle. In various embodiments described herein, the following three observations, among other inventive principles, are applied to predicting the movement of vehicles and providing driving recommendations: (1) each vehicle generally has more accurate acceleration, position, and speed data pertaining to itself than is available to another vehicle performing an analysis from afar based on sensor data; (2) processing graph data representing the spatial relationships among the vehicles using a graph convolutional network (GCN) to summarize or encode the movement data is an effective framework for prediction and an efficient way to represent and share that accurate acceleration, position, and speed data among connected vehicles; and (3) a recurrent neural network (RNN) such as a long short-term memory (LSTM) network can improve the prediction of the movement of surrounding traffic by taking past movement data into account. In various embodiments described herein, the prediction of acceleration is enhanced through the use of probabilistic techniques, such as the use of a mixture model. Examples of a mixture model include, without limitation, a Gaussian Mixture Model (GMM) and a Bernoulli Mixture Model (BMM).

In some embodiments, the driving recommendations derived from the predicted vehicle movement can be presented to a human driver as a specific recommended maneuver (e.g., to change lanes, slow down, etc.). In other embodiments, a driving recommendation (e.g., to slow down to a particular speed, to steer along a particular trajectory, etc.) can be automatically input to a control system of a vehicle to control operation of the vehicle in accordance with the driving recommendation. Examples of such control systems include, without limitation, an advanced driver assistance system (ADAS), an adaptive cruise control (ACC) system, and an autonomous driving system.

One advantage of the embodiments described herein is that the model accounts for not only the predicted movement of an ego vehicle's nearest-neighbor vehicles (those immediately surrounding the ego vehicle in the same lane and/or adjacent lanes) but also for that of vehicles that are more distant from the ego vehicle. Being able to predict the movement of vehicles at a greater distance from the ego vehicle can improve the driving recommendations derived from the predicted movement. For example, detecting that several vehicles a couple of hundred feet ahead of the ego vehicle have had to slow down suddenly (e.g., due to a child or animal entering the roadway) permits the system to provide a timely, relevant driving recommendation to the ego vehicle.

Embodiments in which a system for providing driving recommendations is installed in each of one or more connected vehicles and other embodiments in which the system is embodied in a cloud server or in one or more roadside units (RSUs) that communicate with connected vehicles are described below.

Referring to FIG. 1, an example of a vehicle 100, in which systems and methods disclosed herein can be implemented, is illustrated. The vehicle 100 can include a driving recommendation system 170 or components and/or modules thereof. As used herein, a "vehicle" is any form of motorized transport. In one or more implementations, the vehicle 100 can be an automobile. In some implementations, the vehicle 100 may be any other form of motorized transport. In some embodiments, vehicle 100 is capable of operating in a semi-autonomous or fully autonomous mode. The vehicle 100 can include the driving recommendation system 170 or capabilities to support or interact with the driving recommendation system 170 and thus benefits from the functionality discussed herein. While arrangements will be described herein with respect to automobiles, it will be understood that implementations are not limited to automobiles. Instead, implementations of the principles discussed herein can be applied to any kind of vehicle, as discussed above. Instances of vehicle 100, as used herein, are equally applicable to any device capable of incorporating the systems or methods described herein. A specific vehicle 100 from whose perspective an analysis of surrounding traffic is performed using driving recommendation system 170 is sometimes referred to herein as an "ego vehicle" or "ego vehicle 100."

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including driving recommendation system 170. While the various elements are shown as being located within the vehicle 100 in FIG. 1, it will be understood that one or more of these elements can be located external to the vehicle 100. Further, the elements shown may be physically separated by large distances.

As shown in FIG. 1, vehicle 100 may communicate with one or more other connected vehicles 185 via a network 190. Also, in some embodiments, as shown in FIG. 1, vehicle 100 may communicate with other network nodes 195 such as users' mobile devices, servers, and RSUs via network 190. As also shown in FIG. 1, vehicle 100, in this embodiment, includes an adaptive cruise control (ACC) system 180. In other embodiments, vehicle 100 may include an advanced driver-assistance system (ADAS) in addition to or instead of ACC system 180.

In FIG. 1, network 190 represents any of a variety of wired and wireless networks. For example, in communicating directly with another vehicle, sometimes referred to as vehicle-to-vehicle (V2V) communication, vehicle 100 can employ a technology such as dedicated short-range communication (DSRC) or Bluetooth Low Energy (BLE). In communicating with a user's mobile device (e.g., a smartphone) or a remote server, vehicle 100 can use a technology such as cellular data or WiFi. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
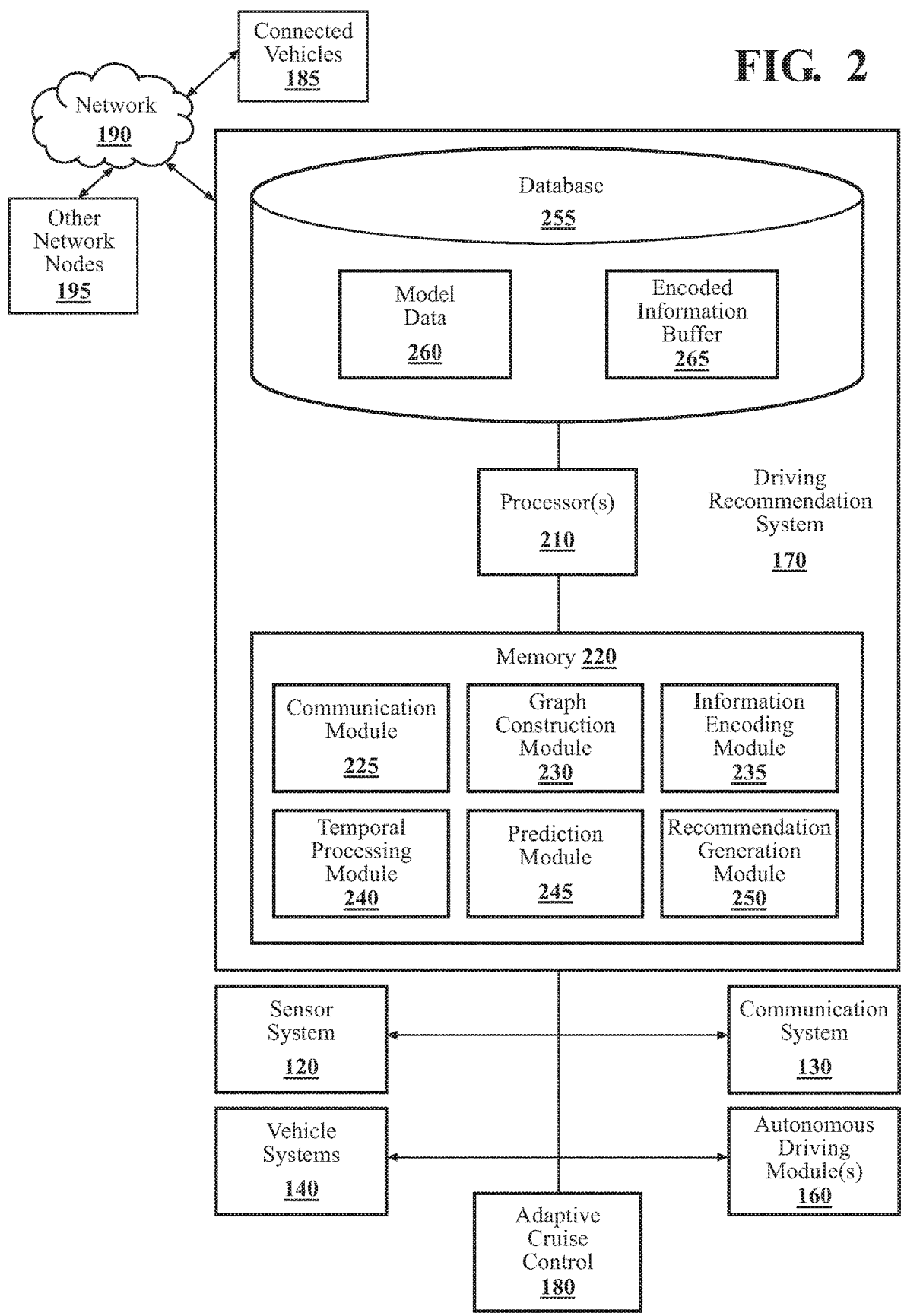
FIG. 2 illustrates one embodiment of a driving recommendation system.

Referring to FIG. 2, one embodiment of the driving recommendation system 170 of FIG. 1 is further illustrated. Though driving recommendation system 170 was first introduced above as a system that is a part of or associated with a vehicle 100, FIG. 2 applies equally to other embodiments in which driving recommendation system 170 is embodied in one or more cloud servers or in one or more roadside units (RSUs). As shown in FIG. 2, driving recommendation system 170 includes one or more processors 210. In embodiments in which driving recommendation system 170 is integrated with vehicle 100 (the "Vehicle Embodiments"), some or all of the one or more processors 210 may coincide with the one or more processors 110 shown in FIG. 1. In those embodiments, the coincident one or more processors 110/210 may be a part of driving recommendation system 170, driving recommendation system 170 may include one or more separate processors from the one or more processors 110 of the vehicle 100, or driving recommendation system 170 may access the one or more processors 110 through a data bus or another communication path, depending on the embodiment.

In various embodiments, memory 220 stores a communication module 225, a graph construction module 230, an information encoding module 235, a temporal processing module 240, a prediction module 245, and a recommendation generation module 250. The memory 220 is a random-access memory (RAM), read-only memory (ROM), a hard-disk drive, a flash memory, or other suitable memory for storing the modules 225, 230, 235, 240, 245, and 250. The modules 225, 230, 235, 240, 245, and 250 are, for example, computer-readable instructions that when executed by the one or more processors 210, cause the one or more processors 210 to perform the various functions disclosed herein. In performing functions such as graph construction, encoding or summarizing graph data, and prediction, some of the modules in driving recommendation system 170 discussed below may store various kinds temporary or persistent data as model data 260 in database 255.

As shown in FIG. 2, driving recommendation system 170 can communicate with one or more connected vehicles 185 and with other network nodes 195 via network 190. In Vehicle Embodiments, driving recommendation system 170 can communicate with one or more other vehicles via V2V connections, as discussed above. In those embodiments, each of the connected vehicles 185 with which driving recommendation system 170 communicates is presumed to include a driving recommendation system 170 in accordance with the Vehicle Embodiments described herein. In embodiments in which driving recommendation system 170 is embodied in a cloud server or a RSU (the "Server/RSU Embodiments"), driving recommendation system 170 can communicate with one or more connected vehicles 185 via a cellular data or WiFi connection.

In Vehicle Embodiments, driving recommendation system 170 may communicate with other systems or subsystems of vehicle 100 such as sensor system 120, communication system 130, various vehicle systems 140, autonomous driving module(s) 160, and ACC system 180, as indicated in FIG. 2. In Server/RSU embodiments, these various vehicle systems and subsystems are not present in the cloud server or RSU but may be part of the connected vehicles 185 with which the cloud server or RSU communicates.

The functions performed by communication module 225 differ somewhat, depending on the embodiment. In Vehicle Embodiments, communication module 225 generally includes instructions that cause the one or more processors 210 to receive, at an ego vehicle 100, vehicle data and encoded information from one or more other vehicles (e.g., connected vehicles 185). In those embodiments, communication module 225 also generally includes instructions that cause the one or more processors 210 to transmit, to the one or more other vehicles, the ego vehicle's own local vehicle data and intermediate encoded information generated by a graph convolutional network (GCN). "Vehicle data," as used herein, refers to data pertaining to a vehicle's movement and/or identity. Examples include, without limitation, the vehicle's position, speed, acceleration, vehicle identification (e.g., a vehicle identification number or "VIN"), and vehicle type (e.g., make, model, classification as "sedan" or "truck," etc.). Movement data such as position, speed, and acceleration is available from an inertial measurement unit (IMU), odometer, dead-reckoning system, and/or global positioning system (GPS) unit in vehicle 100 or a connected vehicle 185. The terms "encoded data" and "intermediate encoded data" are explained in further detail below in connection with other modules of driving recommendation system 170.

In Vehicle Embodiments, driving recommendation system 170 can be configured such that the communication module 225 of an ego vehicle (vehicle 100) communicates directly (e.g., via a V2V connection) with connected vehicles 185 that are within a predetermined distance from the ego vehicle. In one embodiment, a distance parameter r establishing the predetermined distance just mentioned is set to 20 feet. In other embodiments, this distance parameter can be set to a different value. In some embodiments, the parameter r is selected such that communication module 225 communicates directly with vehicles traveling within the predetermined distance, and the predetermined distance is selected such that the ego vehicle communicates directly with nearby vehicles in the same lane as the ego vehicle or in an adjacent lane (one or fewer lanes away from the ego vehicle). This is illustrated in FIG. 3A.

Figure 3B:
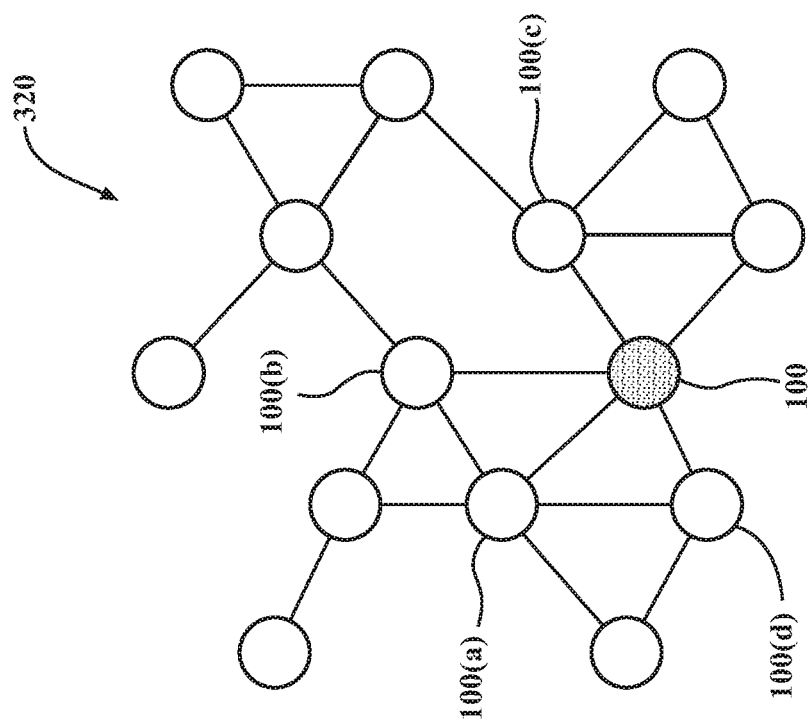
FIG. 3B illustrates graph data representing spatial relationships among a plurality of vehicles, in accordance with an illustrative embodiment of the invention.
Figure 3A:
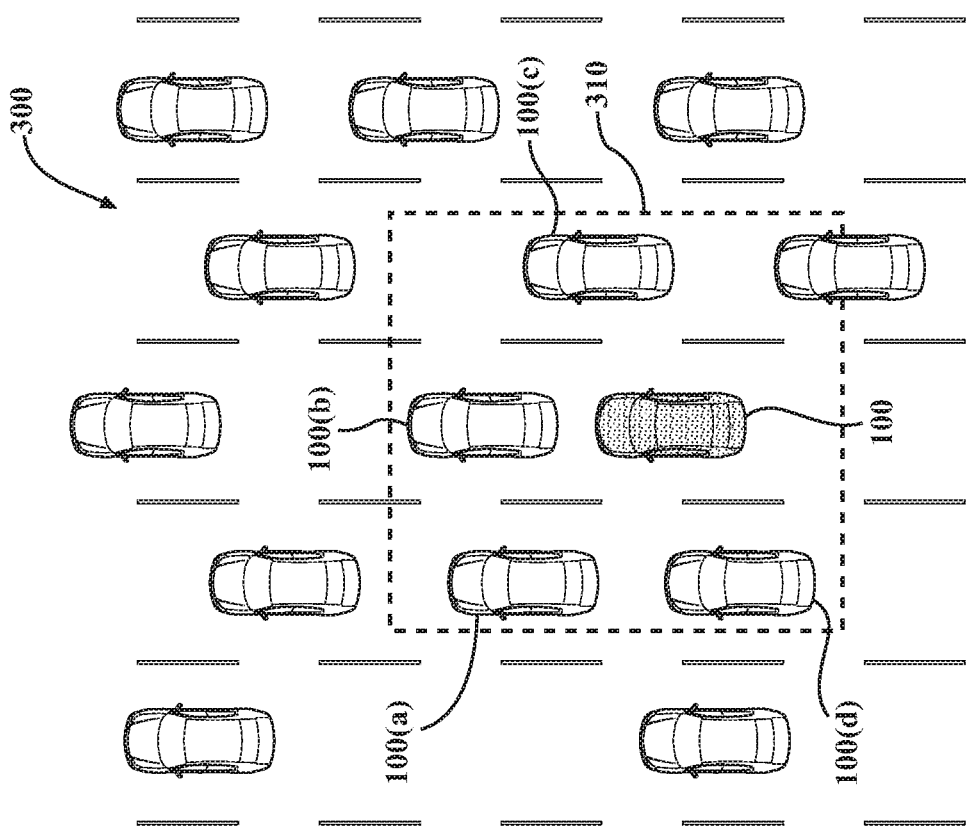
FIG. 3A illustrates an environment in which embodiments of a driving recommendation system can be deployed.

FIG. 3A illustrates an environment 300 in which embodiments of a driving recommendation system 170 can be deployed. FIG. 3A depicts an ego vehicle 100 surrounded by a number of other vehicles on a multi-lane roadway. For the purposes of driving recommendation system 170, a predetermined distance around the ego vehicle for direct V2V communication has been specified, which is shown in FIG. 3A as the region 310. Enclosed within that region 310, in this example, are four nearest-neighbor vehicles 100(a)-(d). In the embodiments mentioned above, communication module 225 communicates directly with the nearest-neighbor vehicles 100(a)-(d) to receive and transmit vehicle data and encoded information.

In Server/RSU embodiments, communication module 225 generally includes instructions that cause the one or more processors 210 to receive vehicle data from one or more vehicles (e.g., connected vehicles 185). In those embodiments, communication module 225 generally also includes instructions that cause the one or more processors 210 to transmit a driving recommendation to at least one of the one or more vehicles. The Server/RSU embodiments are discussed in greater detail below in connection with FIGS. 6 and 7.

Graph construction module 230 generally includes instructions that cause the one or more processors 210 to construct, from vehicle data, graph data (sometimes referred to in the literature as a "graph model") representing how a group of vehicles are spatially related. For example, in Vehicle Embodiments, graph construction module 230 constructs graph data based on the vehicle data received from one or more other connected vehicles 185, the graph data representing how the ego vehicle and the other vehicles are spatially related to one another. Similarly, in Server/RSU embodiments, graph construction module 230 constructs graph data representing the spatial relationships among a group of vehicles within a selected area or region. An example of graph data in the context of the Vehicle Embodiments is shown in FIG. 3B.

FIG. 3B illustrates graph data 320 representing spatial relationships among a plurality of vehicles, in accordance with an illustrative embodiment of the invention. Refer to FIG. 3A for the scenario on which the graph data 320 is based. Graph data 320 includes a node representing the ego vehicle 100 and a number of other nodes representing other vehicles, the nearest-neighbor vehicles to the ego vehicle within the predetermined distance discussed above being labeled as vehicles 100(a)-(d) in FIG. 3B. The nodes of graph data 320 are connected by edges (the lines connecting the nodes in FIG. 3B).

Information encoding module 235 generally includes instructions that cause the one or more processors 210 to encode or summarize the data associated with the nodes of graph data using a GCN. In Vehicle Embodiments, information encoding module 235 inputs the graph data, vehicle data received from other vehicles, local vehicle data pertaining specifically to the ego vehicle, and encoded information received from the other vehicles to a GCN, and the GCN outputs encoded information that can be further analyzed by temporal processing module 240. In Server/RSU embodiments, information encoding module 235 inputs the graph data and the received vehicle data to the GCN, and the GCN outputs encoded information that can be further analyzed by temporal processing module 240.

The encoded information output by the GCN may be termed "final encoded information." As discussed further below, in some implementations, the GCN may be divided into two or more layers, and there can be, in those embodiments, "intermediate encoded information" passed from one layer of the GCN to another.

The type of GCN employed by information encoding module 235 can vary, depending on the embodiment. In one embodiment, the GCN is an ego-discriminated GCN or "EGCN." In this model, the self-connection is removed, and different layer weights are applied to distinguish the central node (the ego vehicle) from its surrounding nodes. In another embodiment, a distance-aware GCN or "DGCN" is employed. Such a model accounts for the actual distances among the vehicles to which the nodes of the graph data correspond. A layer-wise propagation rule in a multi-layer DGCN implementation can be expressed as follows:

$$H^{l+1} = \sigma(AGG(\tilde{D}^{-\frac{1}{2}}\tilde{A}\tilde{D}^{-\frac{1}{2}}H^lW^l, I_NH^lB^l)),$$

where $\sigma$ is an activation function, $H^1$ is the encoding of all nodes in the graph data at depth l, $I_N \in \mathbb{R}^N$ is an identity matrix, $B^l \in \mathbb{R}^{N \times c^l}$ trainable weights at depth l, $W^l$ is a weight at depth l, AGG $(M_1, M_2)$ is a matrix operation that aggregates two matrices of the same shape (by addition or concatenation), $\tilde{A}$ is an adjacency matrix with $$\tilde{A}_{ij} = \frac{1}{|y_{v_i} - y_{v_j}|},$$

$y_{v_i}$ representing a vehicle $v_i$'s y-coordinate (the spatial coordinate of the vehicle's position in the longitudinal direction—along the direction of travel), and $\tilde{D}$ is a degree matrix with $\tilde{D}_{ii} = \Sigma_j \tilde{A}_{ij}$. In this propagation rule, $\tilde{A}$'s entries denote the degree of closeness between vehicles. In one embodiment, the gradients are stabilized during training by discretizing the degree of closeness into three levels "1," "2," and "3," representing far away, medium close, and very close, respectively. The above layer-wise propagation rule can also be written in the following vector form:

$$h_{v_i}^{l+1} = \sigma\left(AGG\left(\Sigma_j \frac{h_{v_j}^l}{\tilde{c}_{ij}}W^l + h_{v_i}^l B^l\right)\right),$$

where $\tilde{c}_{ij}$ is an entry located at the ith row and jth column of $$\tilde{D}^{-\frac{1}{2}}\tilde{A}\tilde{D}^{-\frac{1}{2}}.$$

Temporal processing module 240 generally includes instructions that cause the one or more processors 210 to input encoded information from the GCN and previously stored encoded information to a recurrent neural network (RNN), the RNN outputting a set of parameters to a mixture model. In some embodiments, the RNN is a long short-term memory (LSTM) network. Whereas the GCN encodes information in terms of the spatial relationships among the vehicles represented by the nodes of the graph data, temporal processing module 240 accounts for the temporal (time-related) aspect of the movement data. In other words, the movement predictions ultimately produced by driving recommendation system 170 are improved by considering not only present encoded information but also past encoded information output by the GCN. Both present (newly generated) and past encoded information can be stored in encoded information buffer 265.

Prediction module 245 generally includes instructions that cause the one or more processors 210 to predict the future acceleration of one or more vehicles using the mixture model. Various kinds of mixture models can be used, depending on the particular embodiment. Examples include, without limitation, a Gaussian Mixture Model (GMM) and a Bernoulli Mixture Model (BMM), as discussed above. As those skilled in the art are aware, acceleration can be predicted by sampling a probability distribution of acceleration output by a mixture model. For example, the most likely acceleration can be sampled for a given vehicle. For a K-component mixture model, the probability of the predicted acceleration is expressed by the following equation:

$$p(a)=\Sigma_{i=1}^{K} w_i \mathcal{N}(a|\mu_i, \sigma_i^2),$$

where $w_i$, $\mu_i$, and $\sigma_i$ are the weight, mean, and standard deviation of the ith mixture component, respectively.

In some embodiments, whether they are Vehicle Embodiments or Server/RSU embodiments, prediction module 245 can predict other aspects of a vehicle's future motion other than acceleration. For example, in some embodiments, prediction module 245 uses one or more kinematic (physics-based) models to predict a vehicle's trajectory (position) and speed.

Recommendation generation module 250 generally includes instructions that cause the one or more processors 210 to generate a driving recommendation for a vehicle based, at least in part, on the predicted acceleration of one or more vehicles. In Vehicle Embodiments, recommendation generation module 250 generates a driving recommendation for the ego vehicle (e.g., a vehicle 100) based, at least in part, on the predicted acceleration of one or more other vehicles (e.g., one or more connected vehicles 185). In Server/RSU embodiments, recommendation generation module 250 generates a driving recommendation for one or more of the one or more vehicles analyzed in graph data at the cloud server or RSU based, at least in part, on the predicted acceleration of or more of the other analyzed vehicles. In some embodiments, recommendation generation module 250 generates a driving recommendation for each of a plurality of vehicles analyzed in one or more sets of graph data. In those embodiments, communication module 225 can transmit the driving recommendations to the respective vehicles via network 190.

A driving recommendation can take on different forms, depending on the particular embodiment. In some Vehicle Embodiments, recommendation generation module 250 presents the driving recommendation to a human driver of an ego vehicle 100 as a recommended driving maneuver (e.g., to slow down or change lanes). In doing so, recommendation generation module 250 can present the driving recommendation in the form of text on a display, possibly a head-up display (HUD) in the vehicle, in some embodiments. In other embodiments, recommendation generation module 250 can present the driving recommendation as an audible statement through pre-recorded or computer-generated speech. In still other embodiments, these methods of presentation can be combined.

In other Vehicle Embodiments, recommendation generation module 250 automatically inputs the driving recommendation to a control system of the ego vehicle to control operation of the ego vehicle in accordance with the driving recommendation. As discussed above, examples of such a control system include, without limitation, an ADAS, an ACC system 180 (see FIG. 1), and an autonomous driving system (e.g., autonomous driving module(s) 160 in FIG. 1). The driving recommendation, when input to such a control system, can effect a change in the vehicle's acceleration (speeding up or slowing down), steering, braking, or a combination thereof.

In Server/RSU embodiments, a driving recommendation transmitted to a vehicle can similarly take on different forms, depending on the situation and the particular embodiment. That is, in some embodiments, recommendation generation module 250 can generate a driving recommendation that, when received by a vehicle, is displayed visually (e.g., as text) or communicated via audio to the human driver of the vehicle. In other embodiments, the driving recommendation received by the vehicle from a server or RSU can be automatically input to a control system of the vehicle to control operation of the vehicle in accordance with the driving recommendation, as discussed above.

How the various modules of driving recommendation system 170 work together architecturally in Vehicle Embodiments and Server/RSU embodiments, respectively, is explained below in connection with FIGS. 4 and 6.

Figure 4:
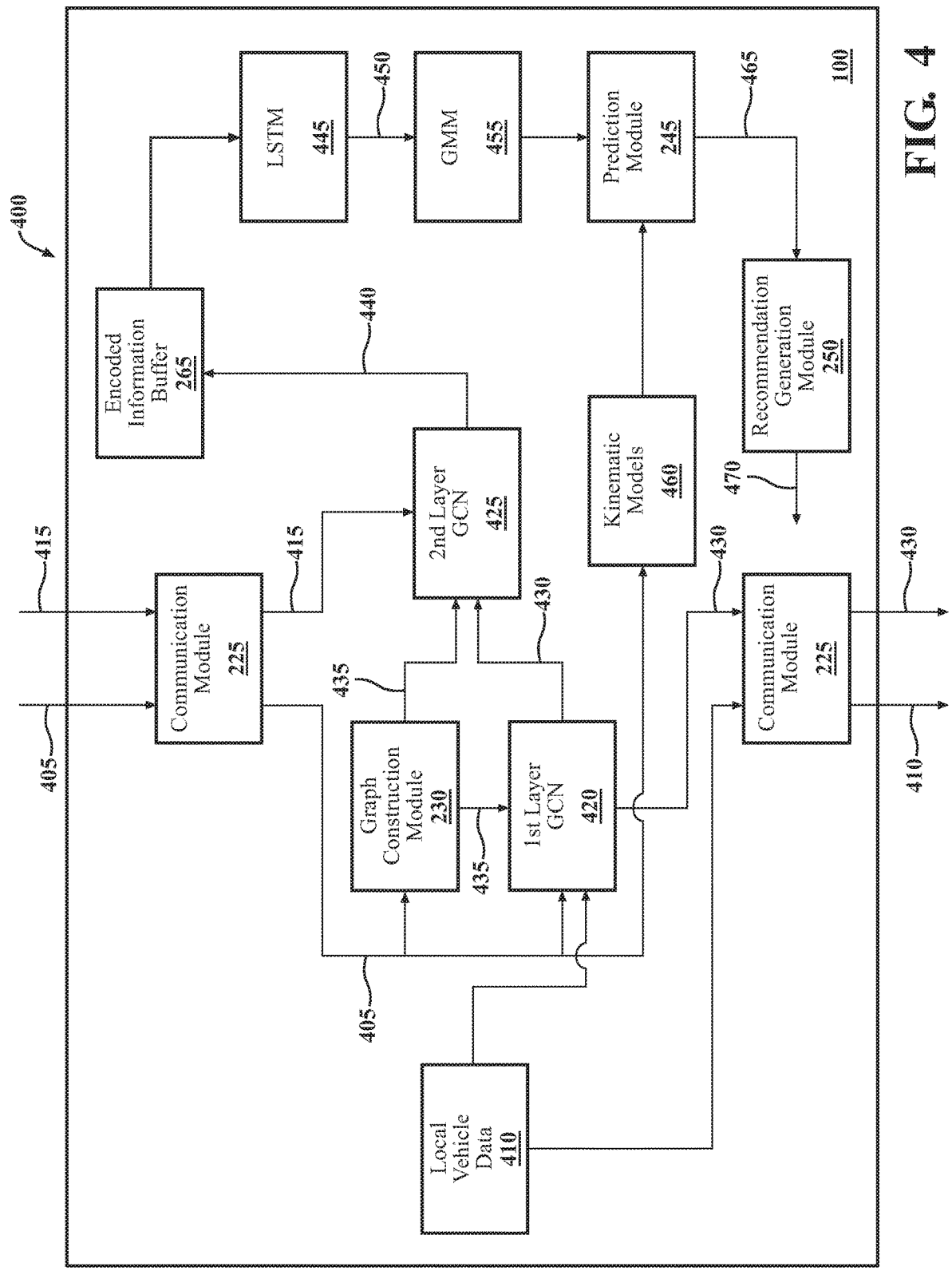
FIG. 4 illustrates an architecture for a driving recommendation system, in accordance with an illustrative embodiment of the invention.

FIG. 4 illustrates an architecture 400 for a driving recommendation system, in accordance with an illustrative embodiment of the invention. The architecture 400 in FIG. 4 corresponds to Vehicle Embodiments of driving recommendation system 170. As shown in FIG. 4, communication module 225 receives other-vehicle data 405 and other-vehicle encoded information 415 from one or more connected vehicles 185 that are in direct (e.g., V2V) communication with ego vehicle 100 and that are equipped with a similar or compatible driving recommendation system 170. It is important to recognize that the other-vehicle encoded information 415 has been encoded by the respective GCNs in the other vehicles. Also, it is important to recognize that the other-vehicle encoded information 415, since it originates from other vehicles whose nearest-neighbor vehicles may not be in direct communication with the ego vehicle 100, includes encoded information pertaining to vehicles in addition to the one or more vehicles with which the ego vehicle 100 is in direct communication. This expands the reach or range of driving recommendation system 170 and supports generating driving recommendations that involve predicting the future motion of vehicles at a greater distance from ego vehicle 100 (e.g., several hundred feet) than would otherwise be possible.

As shown in FIG. 4, the received other-vehicle data 405 is input to graph construction module 230. The other-vehicle data 405, along with local-vehicle data 410 (the ego vehicle's vehicle data) are input to first GCN layer 420. Graph construction module 230 outputs graph data 435, and first GCN layer 420 outputs intermediate encoded information 430. The graph data 435 and the intermediate encoded information 430 are input to second GCN layer 425. The other-vehicle encoded information 415 discussed above is also input to second GCN layer 425. Second GCN layer 425 outputs final encoded information 440, which is cumulatively stored with the past encoded information in encoded information buffer 265. The cumulative encoded information in encoded information buffer 265 is input to LSTM network 445, which outputs GMM parameters 450 to GMM 455. Prediction module 245 samples the acceleration distribution output by the GMM to predict the future acceleration of the one or more other vehicles. In some embodiments, prediction module 245 also predicts the position (trajectory) and/or speed of the one or more other vehicles using one or more kinematic models 460. The predictions made by prediction module 245 can be output as motion predictions 465 to recommendation generation module 250.

Based at least in part on the predicted acceleration of the one or more other vehicles (and, in some embodiments, on additional motion predictions such as position and/or speed), recommendation generation module 250 generates a driving recommendation 470 for the ego vehicle 100.

As discussed above, communication module 225, in some embodiments, also transmits local-vehicle data 410 and intermediate encoded information 430 to the one or more other vehicles with which it is in direct communication.

Though the embodiment shown in FIG. 4 includes a GMM, in other embodiments, a different kind of mixture model can be used.

In some embodiments, the operations described above are performed iteratively at a predetermined periodic rate. For example, in some embodiments, driving recommendation system 170 operates based on 0.1-second timeframes. In those embodiments, driving recommendation system 170 can predict vehicle motion and generate driving recommendations that are pertinent over a time horizon extending from approximately 0.1 to 5 s.

Figure 5:
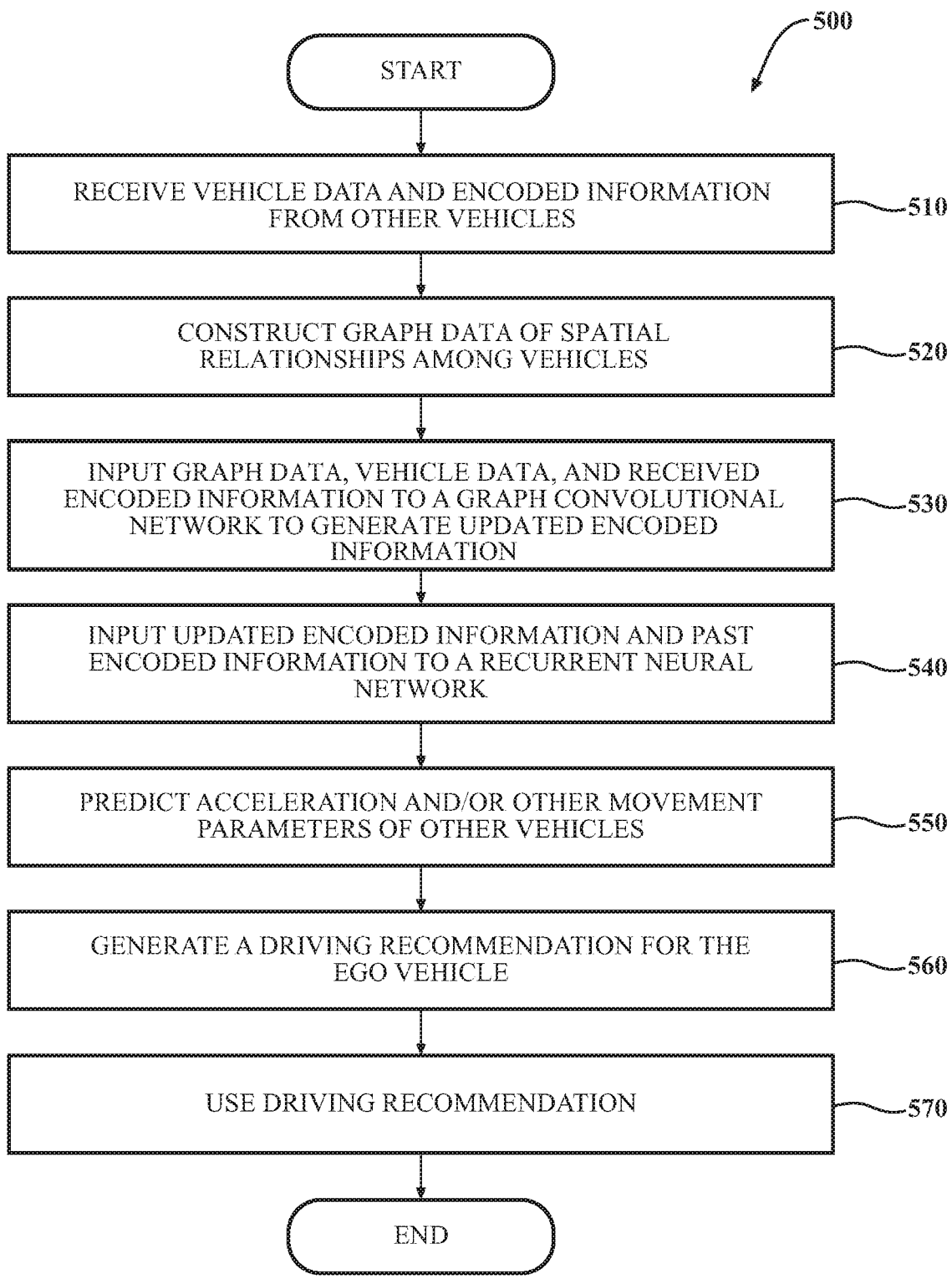
FIG. 5 is a flowchart of a method of providing driving recommendations, in accordance with an illustrative embodiment of the invention.

FIG. 5 is a flowchart of a method 500 of providing driving recommendations, in accordance with an illustrative embodiment of the invention. Method 500 will be discussed from the perspective of driving recommendation system 170 in FIG. 2 in the context of Vehicle Embodiments (refer to the architecture 400 in FIG. 4). While method 500 is discussed in combination with driving recommendation system 170, it should be appreciated that method 500 is not limited to being implemented within driving recommendation system 170, but driving recommendation system 170 is instead one example of a system that may implement method 500.

At block 510, communication module 225 receives, at an ego vehicle 100, vehicle data and encoded information from one or more other vehicles (e.g., connected vehicles 185). As discussed above, in some embodiments, this is accomplished via V2V communication, and communication module 225 communicates directly with nearest-neighbor vehicles that are within a predetermined distance from the ego vehicle 100. As also discussed above, the choice of predetermined distance, in some embodiments, is such that the ego vehicle 100 communicates directly with nearby vehicles traveling in the same or adjacent lanes (one or fewer lanes away).

At block 520, graph construction module 230 constructs, from the vehicle data, graph data representing how the ego vehicle 100 and the one or more other vehicles are spatially related. An example of such graph data is provided in FIG. 3B, as discussed above.

At block 530, information encoding module 235 inputs the graph data, the vehicle data from the one or more other vehicles, vehicle data from the ego vehicle 100 itself, and the encoded information received from the one or more other vehicles to a GCN, the GCN outputting final encoded information. As discussed above in connection with FIG. 4, in some embodiments, the GCN may include more than one layer.

At block 540, temporal processing module 240 inputs the newly acquired final encoded information and the previously stored encoded information to a RNN (e.g., an LSTM), the RNN outputting a set of parameters to a mixture model. As discussed above, temporal processing module 240 accounts for the temporal relationships among the encoded information.

At block 550, prediction module 245 predicts the future acceleration of the one or more other vehicles using the mixture model (e.g., by sampling a probability distribution for acceleration). As discussed above, in some embodiments, prediction module 245 also predicts the position and/or speed of the one or more other vehicles using one or more kinematic models (see Element 460 in FIG. 4).

At block 560, recommendation generation module 250 generates a driving recommendation for the ego vehicle 100 based, at least in part, on the predicted acceleration of the one or more other vehicles. As discussed above, in some embodiments, recommendation generation module 250 can generate a driving recommendation for the ego vehicle 100 that is also based, at least in part, on the predicted position and/or speed of the one or more other vehicles.

At block 570, driving recommendation system 170 can make use of the driving recommendation output by recommendation generation module 250. As discussed above, in some embodiments, a driving recommendation can be presented (visually and/or audibly) to a human driver of the ego vehicle 100. In other embodiments, a driving recommendation can be input to a control system of the ego vehicle 100 to cause the vehicle to operate in accordance with the driving recommendation. As discussed above, examples of a vehicle control system include, without limitation, an ADAS, an ACC system, and autonomous driving module(s) 160.

Figure 6:
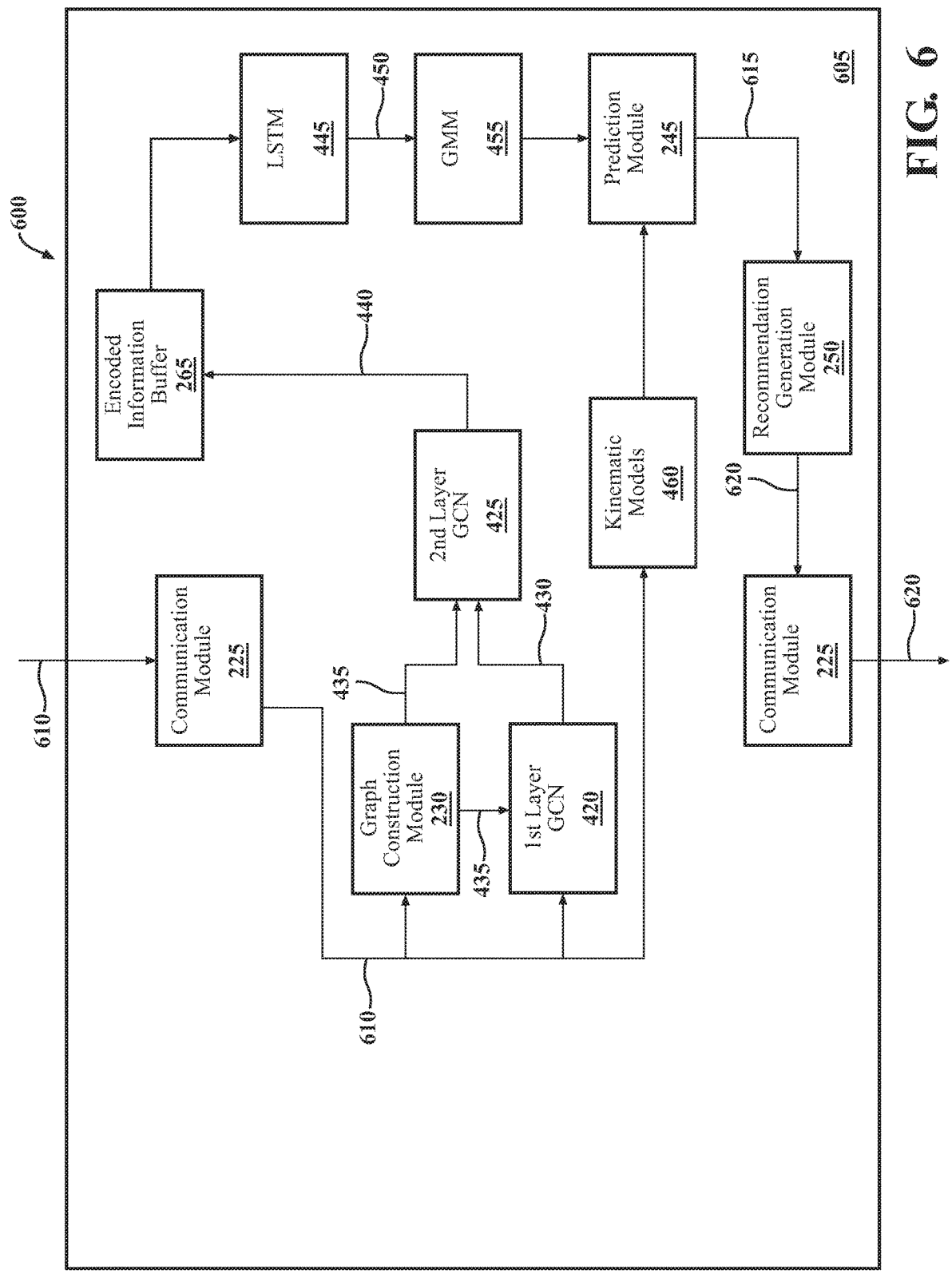
FIG. 6 illustrates an architecture for a driving recommendation system, in accordance with another illustrative embodiment of the invention.

FIG. 6 illustrates an architecture 600 for a driving recommendation system, in accordance with another illustrative embodiment of the invention. The architecture 600 in FIG. 6 corresponds to Server/RSU embodiments of driving recommendation system 170. Thus, Element 605 in FIG. 6 represents either a cloud server or a RSU, depending on the particular embodiment. As shown in FIG. 6, communication module 225 receives vehicle data 610 from one or more connected vehicles 185. The received vehicle data 610 is input to graph construction module 230 and to first GCN layer 420. Graph construction module 230 outputs graph data 435, and first GCN layer 420 outputs intermediate encoded information 430. The graph data 435 and the intermediate encoded information 430 are input to second GCN layer 425. Second GCN layer 425 outputs final encoded information 440, which is cumulatively stored with the past encoded information in encoded information buffer 265. The cumulative encoded information in encoded information buffer 265 is input to LSTM network 445, which outputs GMM parameters 450 to GMM 455. Prediction module 245 samples the acceleration distribution output by the GMM 455 to predict the future acceleration of the one or more connected vehicles 185. In some embodiments, prediction module 245 also predicts the position (trajectory) and/or speed of the one or more connected vehicles 185 using one or more kinematic models 460. The predictions made by prediction module 245 can be output as motion predictions 615 to recommendation generation module 250.

Based at least in part on the predicted acceleration of the one or more connected vehicles 185 (and, in some embodiments, on additional motion predictions such as position and/or speed), recommendation generation module 250 generates a driving recommendation 620 for at least one of the one or more connected vehicles 185. As discussed above, communication module 225 transmits the one or more driving recommendations 620 to the respective vehicles via network 190.

Though the embodiment shown in FIG. 6 includes a GMM, in other embodiments, a different kind of mixture model can be used.

In some embodiments, the operations described above are performed repeatedly or iteratively at a predetermined rate. For example, in some embodiments, driving recommendation system 170 operates based on 0.1-second frames. In those embodiments, driving recommendation system 170 can predict vehicle motion and generate driving recommendations that are pertinent over a time horizon extending from approximately 0.1 to 5 s.

In some embodiments, driving recommendation system 170 is embodied in one or more RSUs located where traffic difficulties (e.g., accidents or traffic jams) are likely to occur. For example, the RSU(s) could be located near the entrance of a tunnel or near a busy intersection.

Figure 7:
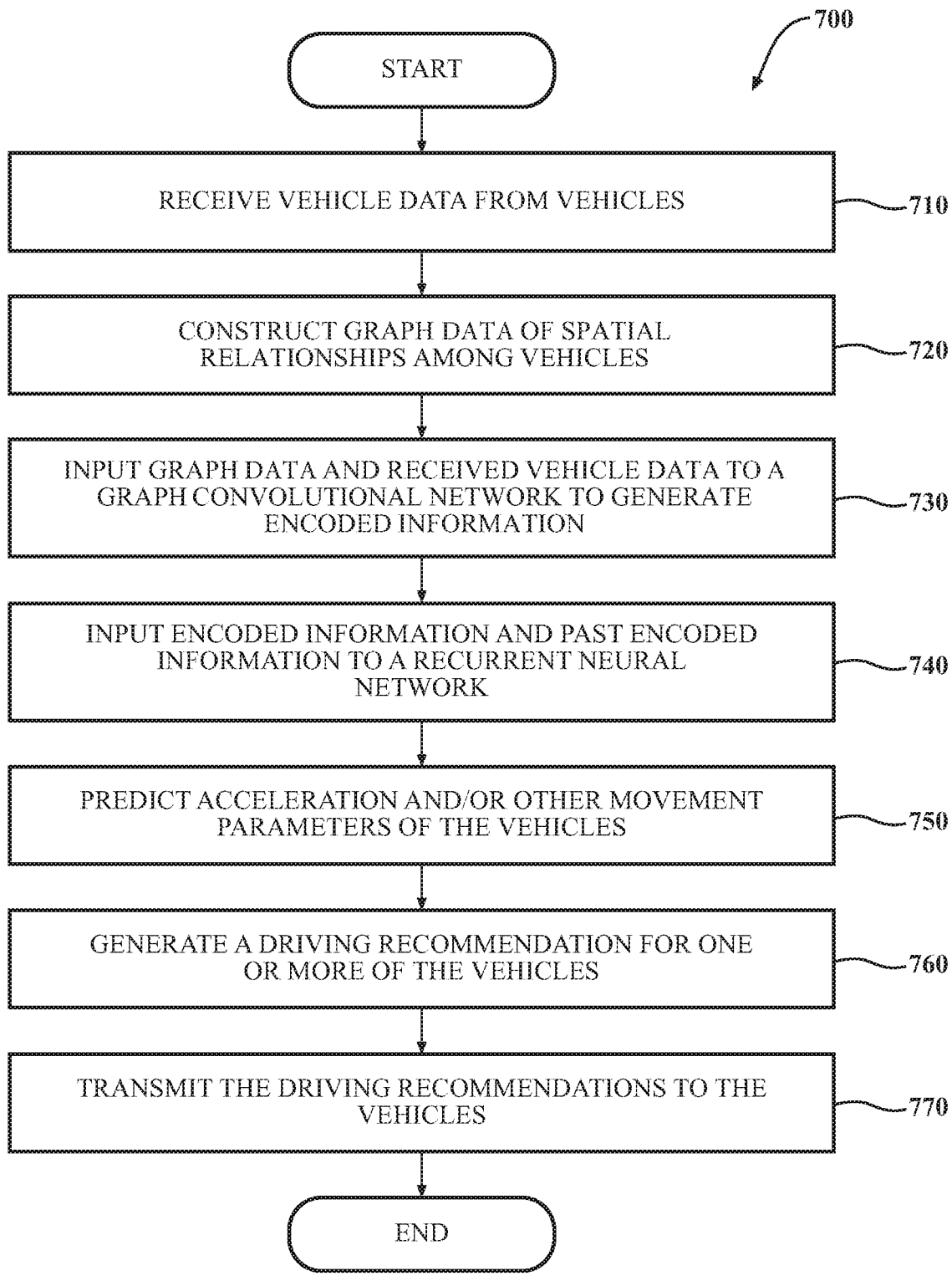
FIG. 7 is a flowchart of a method of providing driving recommendations, in accordance with another illustrative embodiment of the invention.

FIG. 7 is a flowchart of a method 700 of providing driving recommendations, in accordance with an illustrative embodiment of the invention. Method 700 will be discussed from the perspective of driving recommendation system 170 in FIG. 2 in the context of Server/RSU embodiments (refer to the architecture 600 in FIG. 6). While method 700 is discussed in combination with driving recommendation system 170, it should be appreciated that method 700 is not limited to being implemented within driving recommendation system 170, but driving recommendation system 170 is instead one example of a system that may implement method 700.

At block 710, communication module 225 receives vehicle data from one or more connected vehicles 185. As discussed above, in some embodiments, this is accomplished via a cellular-data or WiFi connection.

At block 720, graph construction module 230 constructs, from the received vehicle data, graph data representing how the one or more connected vehicles 185 are spatially related. An example of graph data in the context of Vehicle Embodiments is provided in FIG. 3B, as discussed above.

At block 730, information encoding module 235 inputs the graph data and the vehicle data from the one or more connected vehicles 185 to a GCN, the GCN outputting final encoded information. As discussed above in connection with FIG. 6, in some embodiments, the GCN may include more than one layer.

At block 740, temporal processing module 240 inputs the newly acquired final encoded information and the previously stored encoded information to a RNN (e.g., an LSTM), the RNN outputting a set of parameters to a mixture model. As discussed above, temporal processing module 240 accounts for the temporal relationships among the encoded information.

At block 750, prediction module 245 predicts the future acceleration of the one or more connected vehicles 185 using the mixture model (e.g., sampling a probability distribution for acceleration). As discussed above, in some embodiments, prediction module 245 also predicts the position and/or speed of the one or more connected vehicles 185 using one or more kinematic models (see Element 460 in FIG. 6).

At block 760, recommendation generation module 250 generates a driving recommendation for at least one of the one or more connected vehicles 185 based, at least in part, on the predicted acceleration of the one or more connected vehicles 185. As discussed above, in some embodiments, recommendation generation module 250 can generate a driving recommendation for the ego vehicle 100 that is also based, at least in part, on the predicted position and/or speed of the one or more connected vehicles 185.

At block 770, communication module 225 transmits the driving recommendation to the at least one of the one or more connected vehicles 185. As discussed above, in some embodiments, communication module 225 transmits a driving recommendation to each of a plurality of connected vehicles 185.

Those skilled in the art will recognize that, in performing the calculations expressly or impliedly disclosed above, it may be possible to use a variety of techniques, including one or more lookup tables, to speed up the calculations and/or make them more efficient. Those skilled in the art will also recognize that neural networks such as GCNs and RNNs usually undergo a period of training before they are deployed with "live" data.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-7, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for providing driving recommendations, the system comprising:
   one or more processors; and
   a memory communicably coupled to the one or more processors and storing:
   a communication module including instructions that when executed by the one or more processors cause the one or more processors to receive, at an ego vehicle, first vehicle data and first encoded information from one or more other vehicles, wherein the first encoded information includes vehicle data from the one or more other vehicles that has been encoded by one or more respective graph convolutional networks in the one or more other vehicles;
   a graph construction module including instructions that when executed by the one or more processors cause the one or more processors to construct, from the first vehicle data, graph data representing how the ego vehicle and the one or more other vehicles are spatially related;
   an information encoding module including instructions that when executed by the one or more processors cause the one or more processors to input the graph data, the first vehicle data, second vehicle data pertaining to the ego vehicle, and the first encoded information to a graph convolutional network, the graph convolutional network outputting second encoded information;
   a temporal processing module including instructions that when executed by the one or more processors cause the one or more processors to input the second encoded information and previously stored encoded information to a recurrent neural network, the recurrent neural network outputting a set of parameters to a mixture model;
   a prediction module including instructions that when executed by the one or more processors cause the one or more processors to predict acceleration of the one or more other vehicles using the mixture model; and
   a recommendation generation module including instructions that when executed by the one or more processors cause the one or more processors to generate a driving recommendation for the ego vehicle based, at least in part, on the predicted acceleration of the one or more other vehicles and to input the driving recommendation to a control system of the ego vehicle to control operation of the ego vehicle in accordance with the driving recommendation.

2. The system of claim 1, wherein the recommendation generation module includes further instructions that when executed by the one or more processors cause the one or more processors to present the driving recommendation to a driver of the ego vehicle as a recommended driving maneuver.

3. The system of claim 1, wherein the control system of the ego vehicle is one of an adaptive cruise control system and one or more autonomous driving modules.

4. The system of claim 1, wherein the one or more other vehicles are nearest-neighbor vehicles traveling one or fewer lanes away from a lane in which the ego vehicle is traveling.

5. The system of claim 1, wherein:
   the first vehicle data and the second vehicle data include one or more of position, speed, acceleration, vehicle identification, and vehicle type.

6. The system of claim 1, wherein the first encoded information includes vehicle data from one or more vehicles in addition to the one or more other vehicles that has been encoded by the one or more respective graph convolutional networks in the one or more other vehicles.

7. The system of claim 1, wherein the recurrent neural network includes a long short-term memory network.

8. The system of claim 1, wherein the prediction module includes further instructions that when executed by the one or more processors cause the one or more processors to predict at least one of a trajectory and a speed of the one or more other vehicles using one or more kinematic models and the recommendation generation module includes instructions that when executed by the one or more processors cause the one or more processors to generate the driving recommendation for the ego vehicle based, at least in part, on one or more of the predicted trajectory and the predicted speed of the one or more other vehicles.

9. A method of providing driving recommendations, the method comprising:
   receiving, at an ego vehicle, first vehicle data and first encoded information from one or more other vehicles, wherein the first encoded information includes vehicle data from the one or more other vehicles that has been encoded by one or more respective graph convolutional networks in the one or more other vehicles;
   constructing, from the first vehicle data, graph data representing how the ego vehicle and the one or more other vehicles are spatially related;
   inputting the graph data, the first vehicle data, second vehicle data pertaining to the ego vehicle, and the first encoded information to a graph convolutional network, the graph convolutional network outputting second encoded information;
   inputting the second encoded information and previously stored encoded information to a recurrent neural network, the recurrent neural network outputting a set of parameters to a mixture model;
   predicting acceleration of the one or more other vehicles using the mixture model; and
   generating a driving recommendation for the ego vehicle based, at least in part, on the predicted acceleration of the one or more other vehicles and inputting the driving recommendation to a control system of the ego vehicle to control operation of the ego vehicle in accordance with the driving recommendation.

10. The method of claim 9, further comprising presenting the driving recommendation to a driver of the ego vehicle as a recommended driving maneuver.

11. The method of claim 9, wherein the control system of the ego vehicle is one of an adaptive cruise control system and one or more autonomous driving modules.

12. The method of claim 9, wherein:
   the first vehicle data and the second vehicle data include one or more of position, speed, acceleration, vehicle identification, and vehicle type.

13. The method of claim 9, wherein the first encoded information includes vehicle data from one or more vehicles in addition to the one or more other vehicles that has been encoded by the one or more respective graph convolutional networks in the one or more other vehicles.

14. The method of claim 9, further comprising predicting at least one of a trajectory and a speed of the one or more other vehicles using one or more kinematic models, wherein the generating the driving recommendation for the ego vehicle is based, at least in part, on one or more of the predicted trajectory and the predicted speed of the one or more other vehicles.

15. The method of claim 9, further comprising transmitting, to the one or more other vehicles, the second vehicle data pertaining to the ego vehicle and intermediate encoded information generated by the graph convolutional network.

* * * * *